(12) United States Patent
Yamauchi et al.

(10) Patent No.: US 7,063,637 B2
(45) Date of Patent: Jun. 20, 2006

(54) HYBRID TRANSMISSION

(75) Inventors: Yasuhiro Yamauchi, Kanagawa (JP);
Toshikazu Oshidari, Kanagawa (JP);
Keyvan Kargar, Versailles (FR); Yves Pichon, Boulogne Billancourt (FR)

(73) Assignees: Nissan Motor Co., Ltd., Yokoham (JP); Renault, Boulogne-Billancourt (FR)

( * ) Notice: Subject to any disclaimer, the term of this patent is extended or adjusted under 35 U.S.C. 154(b) by 5 days.

(21) Appl. No.: 10/726,628

(22) Filed: Dec. 4, 2003

(65) Prior Publication Data

US 2004/0110592 A1    Jun. 10, 2004

(30) Foreign Application Priority Data

Dec. 4, 2002    (JP)    ............................. 2002-352225

(51) Int. Cl.
*F16H 3/72*    (2006.01)
(52) U.S. Cl. ........................................................ 475/5
(58) Field of Classification Search ............... 475/1, 475/2, 5
See application file for complete search history.

(56) References Cited

U.S. PATENT DOCUMENTS 5,558,589 A    9/1996    Schmidt
6,022,287 A *  2/2000    Klemen et al. ................ 475/5
6,732,526 B1*  5/2004    Minagawa et al. ........... 60/706
6,910,981 B1*  6/2005    Minagawa et al. ............ 475/5
2002/0143441 A1  10/2002  Yamaguchi et al.
2003/0073534 A1*  4/2003  Oshidari et al. .............. 475/5

FOREIGN PATENT DOCUMENTS

| DE | 199 09 424 A1 | 8/2000 | |
| EP | 1 201 479 A2 | 5/2002 | |
| JP | 61-6447 | * 1/1986 | ................ 475/1 |
| JP | 09-215110 A | 8/1997 | |
| JP | 11-301291 A | 11/1999 | |
| JP | 2000-014081 A | 1/2000 | |

* cited by examiner

*Primary Examiner*—Ha Ho
(74) *Attorney, Agent, or Firm*—Foley & Lardner LLP

(57) ABSTRACT

A hybrid transmission for variably producing a transmission ratio is comprised of first and second motor/generators and a differential mechanism constructed by two double-pinion planetary gearsets. The two double-pinion planetary gearsets are coaxially arranged and commonly employ common pinions. The differential mechanism includes at least four rotating members which are interlinked so that rotating conditions of all of the rotating members are determined when rotating conditions of two of the rotating members are determined. Four of the rotating members are connected to an input from a prime mover, an output to a driveline, first and second mover/generators, respectively.

8 Claims, 6 Drawing Sheets

HYBRID TRANSMISSION

BACKGROUND OF THE INVENTION

The present invention relates to a hybrid transmission which is applicable to a hybrid vehicle equipped with a plurality of power sources such as an internal combustion engine and a motor/generator, and more particularly to a continuously variable hybrid transmission which is capable of continuously varying a transmission ratio using a differential mechanism.

Japanese Patent Provisional Publication No. 11-301291 discloses a hybrid transmission employing a differential mechanism where two simple (single-pinion) planetary gearsets are coaxially aligned, engine output is distributed to both ring gears of the two planetary gearsets, both carriers of the two simple planetary gearsets are connected to a driveline of a vehicle, and both sun gears of the two planetary gearsets are respectively connected to two motor/generators. Further, there is provided a brake for fixing the ring gears by stopping the rotating operation of an engine, in the hybrid transmission.

SUMMARY OF THE INVENTION

However, since this hybrid transmission has a limitation in a transmission-ratio selectable range due to the combination of two single-pinion planetary gearsets.

Inventors of the present invention found that when a differential mechanism is constructed by two double-pinion planetary gearsets, the degree of freedom in designing a transmission-ratio range is improved by employing common long pinions which are commonly employed in the two double-pinion planetary gearsets. That is, the inventors found that a magnitude of a pitch-circle diameter of the pinions does not affect the transmission ratio produced by the combination of the two double-pinion planetary gearsets. Therefore, it becomes possible to freely vary pitch-circle diameters of both sun gears by varying a pitch-circle diameter of other pinions except for the common pinions. This variable setting of the pitch-circle diameters of both sun gears enables the increase of the degree of freedom in designing the transmission-ratio range.

It is therefore an object of the present invention to provide an improved hybrid transmission which has a great degree of freedom in designing a transmission ratio by employing the above-discussed ideas.

An aspect of the present invention resides in a hybrid transmission for variably producing a transmission ratio. The hybrid transmission comprises first and second motor/generators and a differential mechanism constructed by two double-pinion planetary gearsets which are coaxially arranged and commonly employ common pinions. The differential mechanism includes at least four rotating members. The rotating members is interlinked so that rotating conditions of all of the rotating members are determined when rotating conditions of two of the rotating members are determined. Four of the rotating members is connected to an input from a prime mover, an output to a driveline, first and second mover/generators, respectively.

The other objects and features of this invention will become understood from the following description with reference to the accompanying drawings.

DETAILED DESCRIPTION OF THE INVENTION

Referring to drawings, there are discussed embodiments of a hybrid (automatic) transmission according to the present invention.

Figure 1A:
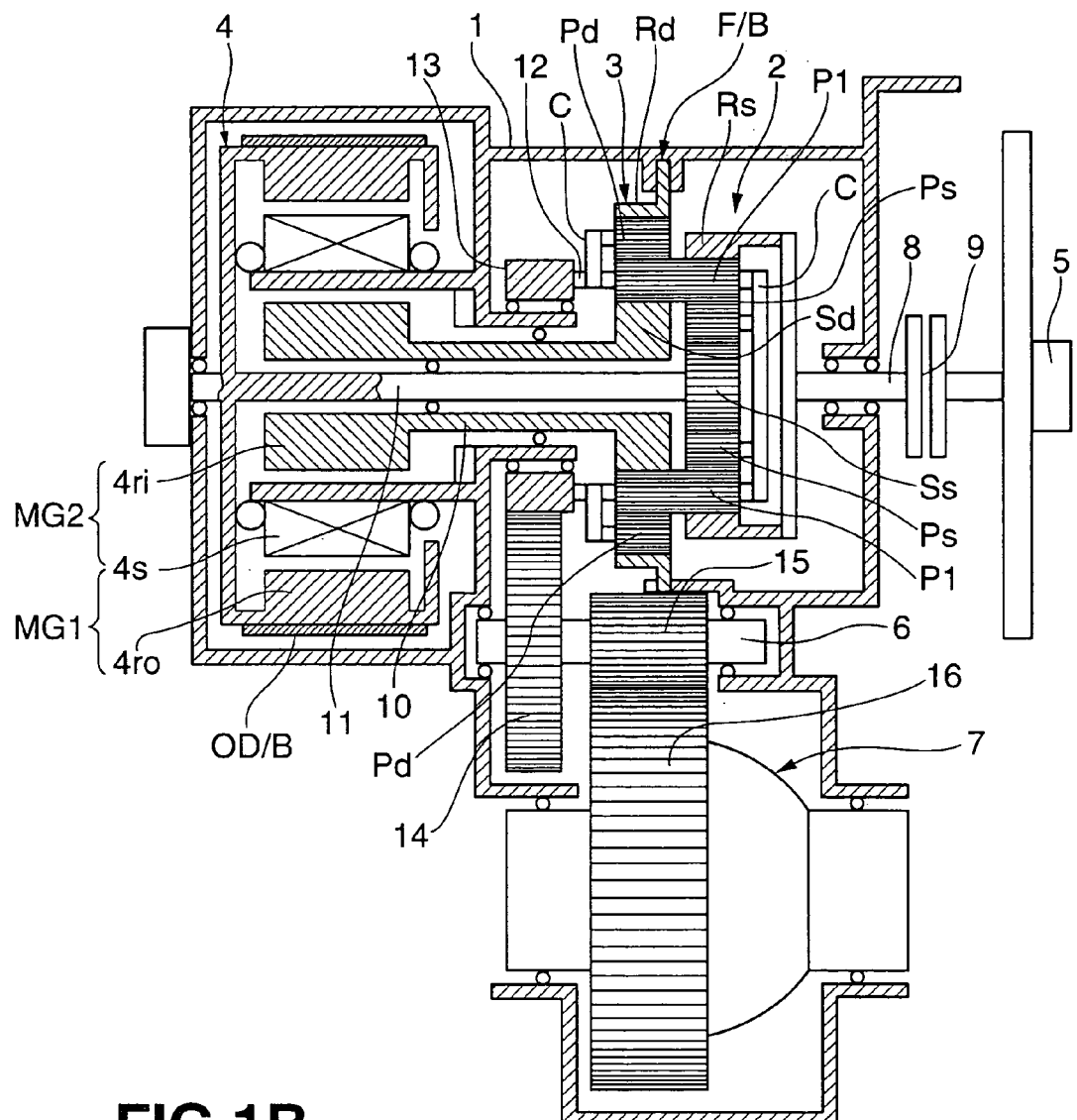
FIG. 1A is a cross-sectional view showing a first embodiment of a hybrid transmission according to the present invention.
Figure 1B:
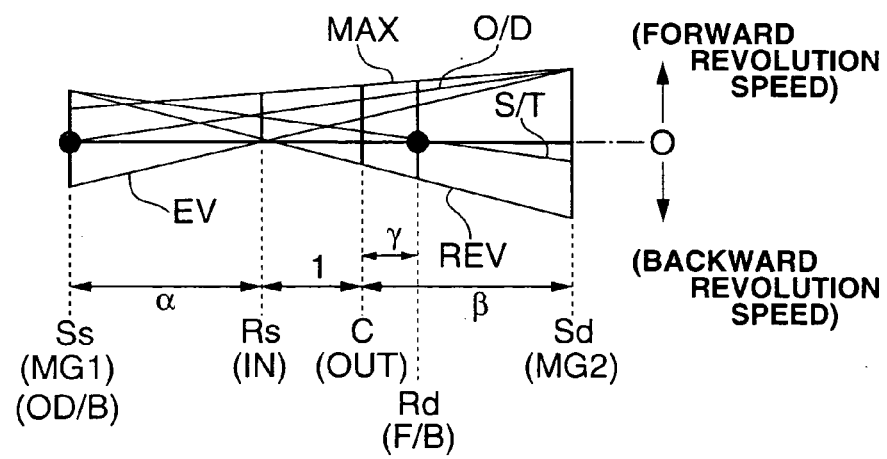
FIG. 1B is a lever diagram of the hybrid transmission of FIG. 1A.

FIGS. 1A and 1B show a first embodiment of the hybrid transmission according to the present invention. In this first embodiment, the hybrid transmission is adapted to a transaxle of a front-wheel-drive vehicle. As shown in FIG. 1A, the hybrid transmission of the first embodiment comprises a transmission case 1, a combination of (a pair of) double-pinion planetary gearsets 2 and 3, and a compound-current double-layer motor 4 constructing first and second motor/generators MG1 and MG2. The combination of double-pinion planetary gearsets 2 and 3 is built in transmission case 1 so as to be located at a left-hand side of an internal combustion engine (prime mover) 5 along an axial direction of transmission case 1 in FIG. 1A. Further, compound-current double-layer motor 4 is built in a transmission case 1 so as to be located at the left-hand side of the combination of double-pinion planetary gearsets 2 and 3 along the axial direction of transmission case 1 in FIG. 1A.

The combination of double-pinion planetary gearsets 2 and 3, engine 5 and compound-current double-layer motor 4 are coaxially arranged on a main axis of transmission case 1. A counter shaft 6 and a differential gear device 7 are also built in transmission case 1 so as to be parallel with the main axis while being offset from the main axis.

The combination of double-pinion planetary gearsets 2 and 3 commonly employs long pinions P1. Double-pinion planetary gearset 2 located near engine 5 employs long pinions P1 as outer pinions. Therefore, long pinions P1 are engaged with a ring gear Rs and short pinions Ps which is engaged with a sun gear Ss. On the other hand, double-pinion planetary gearset 3 located near motor 4 employs long pinions P1 as inner pinions. Therefore, long pinions P1 are engaged with sun gear Sd and short pinions Pd acting as outer pinions. Further, short pinions Pd are engaged with a ring gear Rd. All of pinions P1, Ps and Pd of the combination of double-pinion planetary gearsets 2 and 3 are rotatably supported by a common carrier C.

The combination of double-pinion planetary gearsets 2 and 3 mainly comprises five rotating members (five rotating elements), that is, sun gear Ss, sun gear Sd, ring gear Rs, ring gear Rd and carrier C. When rotating conditions of two of the rotating members in the combination of double-pinion planetary gearsets 2 and 3 are determined, rotating conditions of all of the rotating members are determined. That is to say, the combination of double-pinion planetary gearsets 2 and 3 is a two-degree-of-freedom differential mechanism having five rotating elements.

As is clear from a lever diagram shown in FIG. 1B, the sequence of revolution speeds of the rotating members is arranged in the sequence of sun gear Ss, ring gear Rs, carrier C, ring gear Rd and sun gear Sd.

Compound-current double-layer motor 4 comprises an inter rotor 4ri, an annular outer rotor 4ro surrounding inner rotor 4ri and a stator coil 4s. Inner and outer rotors 4ri and 4ro are coaxially arranged with each other at the rear axial end (the left-hand end) of transmission case 1 and rotatably supported in transmission case 1. Annular stator coil 4s acting as a stator of compound-current double-layer motor 4 is disposed in an annular space defined between the outer periphery of inner rotor 4ri and the inner periphery of outer rotor 4ro and fixedly connected to transmission case 1. Annular stator coil 4s and outer rotor 4ro construct an outer motor/generator (first motor/generator) MG1, and annular stator coil 4s and inner rotor 4ri construct an inner motor/generator (second motor/generator) MG2.

In this embodiment, a compound multiphase alternating current (AC) multi-layer (double-layer) motor 4, which has multiple motors (two rotors in this embodiment) and is driven by compound multiphase AC, is employed as first and second motor/generator MG1 and MG2. Further, compound-current double-layer motor 4 is arranged such that the number of pole pairs of inner rotor 4ri is different from the number of pole pairs of outer rotor 4ro. Outer and inner rotors 4ro and 4ri of first and second motor/generators MG1 and MG2 are therefore driven independently of each other in revolution speed and in revolution direction by compounding a control current applied to one of the motor/generator set and a control current applied to the other.

When compound multiphase alternating current is supplied to each of first and second motor/generators MG1 and MG2, each of motor/generators MG1 and MG2 functions as an electric motor which outputs a rotational force having a revolution direction corresponding to a current direction and a revolution speed corresponding to a current strength of the supplied current. When no compound multiphase alternating current is supplied to each of first and second motor/generators MG1 and MG2, each of first and second motor/generators MG1 and MG2 functions as a generator which outputs an electric power corresponding to the magnitude of torque applied by way of an external force.

As is shown by the lever diagram in FIG. 1B, sun gear Ss, ring gear Rs, carrier C, ring gear Rd, and sun gear Sd, which are five rotating members of the combination of double-pinion planetary gearsets 2 and 3, are connected to first motor/generator MG1 (outer rotor 4ro), an input IN connected to engine 5, an output OUT connected to a wheel driveline, a forward brake F/B to be engaged during a vehicle starting, and second motor/generator MG2 (inner rotor 4ro), respectively, in mentioned sequence. Further, an overdrive brake OD/B to be engaged when the vehicle runs at an overdrive position of the transmission is connected to sun gear Ss. This mentioned sequence of the five rotating members are arranged in the sequence of the revolution speeds from the highest revolution speed.

The connection of the five rotating members of the combination of double-pinion planetary gearsets 2 and 3 will be discussed in detail with reference to FIG. 1A.

Ring gear Rs acts as an input element through which the power of engine 5 is inputted to the hybrid transmission. That is, ring gear Rs is connected to a crankshaft of engine 5 through an input shaft 8 of the hybrid transmission and a clutch 9. Forward brake F/B is provided between ring gear Rd and transmission case 1 so that ring gear Rd is fixable by means of forward brake F/B.

Sun gear Sd is connected to second motor/generator MG2 (inner rotor 4ri) through a hollow shaft 10. Sun gear Ss is connected to first motor/generator MG1 (outer rotor 4ro) through a center shaft 11 which is rotatably supported by second motor/generator MG2 and hollow shaft 10. Overdrive brake OD/B of a band-brake type disposed around outer rotor 4ro so that ring gear Rs is braked at a desired period through the engagement operation of overdrive brake OD/B.

In order to operate carrier C as an output element for outputting the revolution in the transmission to the wheel driveline, carrier C is connected to an output gear 13 through a hollow connecting member 12. Output gear 13 is disposed between the combination of double-pinion planetary gearsets 2 and 3 and compound-current double-layer motor 4, and is engaged with a counter gear 14 integrally connected to counter shaft 6 which is rotatably supported by transmission case 1. A final-drive pinion 15 is also integrally connected to counter shaft 6 and is engaged with a final-drive ring gear 16 provided in a differential gear device 7.

The transmission output revolution outputted from output gear 13 is transmitted to differential gear device 7 through a final drive gearset constructed by final drive pinion 15 and final drive ring gear 16, and is distributed to the right and left wheels (not shown) through differential gear device 7. This transmitting line constitutes a wheel driveline.

The hybrid transmission of the first embodiment achieves the shift operation represented by the lever diagram in FIG. 1B as follows.

There is first discussed the shift operation under a forward (right) revolution outputting state of the hybrid transmission. When the vehicle starts running, output OUT generates a forward (right) revolution by driving first motor/generator MG1 in the forward revolution output direction and by driving second motor/generator MG1 in the backward revolution output direction under a condition that ring gear Rd is put in a fixed condition by engaging forward brake F/B, as shown by a lever S/T of the lever diagram in FIG. 1B.

When the vehicle starts to run in an electric running state, lever S/T amplifies the output torque of first and second motor/generators MG1 and MG2 by a lever ratio of lever S/T wherein ring gear Rd acts as a fulcrum, sun gears Ss and Sd act as an effort (power applied points), and carrier C acts as a load (working point). The amplified output torque is therefore outputted from output OUT so as to enable the forward starting using the large forward torque. This achieves the wheel driving torque requested in the electric running state without increasing the power capacity of first and second motor/generators MG1 and MG2.

After the forward starting, the fixing of ring gear Rd is cancelled by disengaging forward brake F/B so that the driving of the wheels can be achieved by the engine output upon properly starting engine 5. Thereafter, by stopping the motor operation of second motor/generator MG2, the shifting state of the hybrid transmission is varied from a state shown by lever S/T to a state shown by lever MAX on the lever diagram in FIG. 1B. Until the revolution speed of second motor/generator MG2 becomes zero, second motor/generator MG2 acts as a generator to generate electric power. By employing this electric power generated by second motor/generator MG2 to drive first motor/generator MG1, it becomes possible to continue running the vehicle while keeping an electric balance at a balanced state.

When a large engine brake is required during the forward vehicle running to decelerate the vehicle, by forcibly lowering the revolution speed of engine 5 through ring gear Rd in a manner of again engaging forward brake F/B, an expected large engine brake is ensured according to the degree of the engagement of forward brake F/B.

The vehicle running at the overdrive shift position is achieved by setting the lever ratio as shown by a sharp-gradient lever O/D on the lever diagram in FIG. 1B. That is, by setting the lever ratio at an overdrive transmission ratio, the wheels are driven by the output of engine 5 (IN) under a state of fixing sun gear Ss by the engagement of overdrive brake OD/B.

When overdrive brake OD/B is put in a disengaged state as a result of not desiring an overdrive running, there are two transmission ratios (ratio between input revolution speed and output revolution speed) where the revolution speed of one of first and second motor/generators MG1 and MG2 takes zero. At these transmission ratios, it is possible to operate the hybrid transmission without electrically transmitting motive power.

Further, when the transmission ratio between these two transmission ratios is selected, the rate of the electric power transmission, which is lower in efficiency than the mechanical power transmission, is suppressed in the power transmitted by the hybrid transmission. This improves the transmission efficiency of the hybrid transmission.

When the electric (EV) running state is selected by driving the vehicle only using the power of first and second motor/generators MG1 and MG2 without employing the power of engine 5, by setting the lever ratio of the hybrid transmission at a lever EV on the lever diagram in FIG. 1B, second motor/generator MG2 is driven in the forward revolution output direction and first motor/generator MG1 is driven in the backward revolution output direction so that the forward revolution is generated at output OUT so as to enable the forward EV mode running.

In case that input shaft 8 of the hybrid transmission is connected to engine 5 through the one-way clutch through not shown in Figures, when the vehicle is stopping during the EV mode running, two points on the lever diagram are fixed so as not to move in the backward direction by engaging one of forward brake F/B and overdrive brake OD/B. This arrangement simplifies a vehicle starting after the vehicle selecting the EV mode running temporally stops on an upslope.

Subsequently, there is discussed the shift operation of the hybrid transmission in case that the backward (reverse) revolution output state is selected. When the backward running is selected, by setting the lever ratio of the lever diagram at a lever REV shown in FIG. 1B, second motor/generator MG2 is driven in the backward revolution output direction and first motor/generator MG1 is driven in the forward revolution output direction so that the reverse (backward) revolution is generated at output OUT.

With the thus arrangements according to the first embodiment of the present invention, the following advantages are obtained.

When a gear ratio from engine 5 (IN) to output OUT is set at 1 on the lever diagram shown in FIG. 1B, a gear ratio between engine 5 (IN) and first motor/generator MG1 (overdrive brake OD/B) is $\alpha$, a gear ratio between output OUT and second motor/generator MG2 is $\beta$, and a gear ratio between output OUT and forward brake F/B is $\gamma$. A relationship among $\alpha$, $\beta$ and $\gamma$ is represented by the following expressions (1), (2) and (3) using the number of teeth of each gear. Herein the number of teeth of each gear is represented by a reference showing each gear.

$$\alpha=(Rs/Ss)-1 \tag{1}$$

$$\beta=(Rs/Sd) \tag{2}$$

$$\gamma=(Rs/Rd) \tag{3}$$

Figure 5:
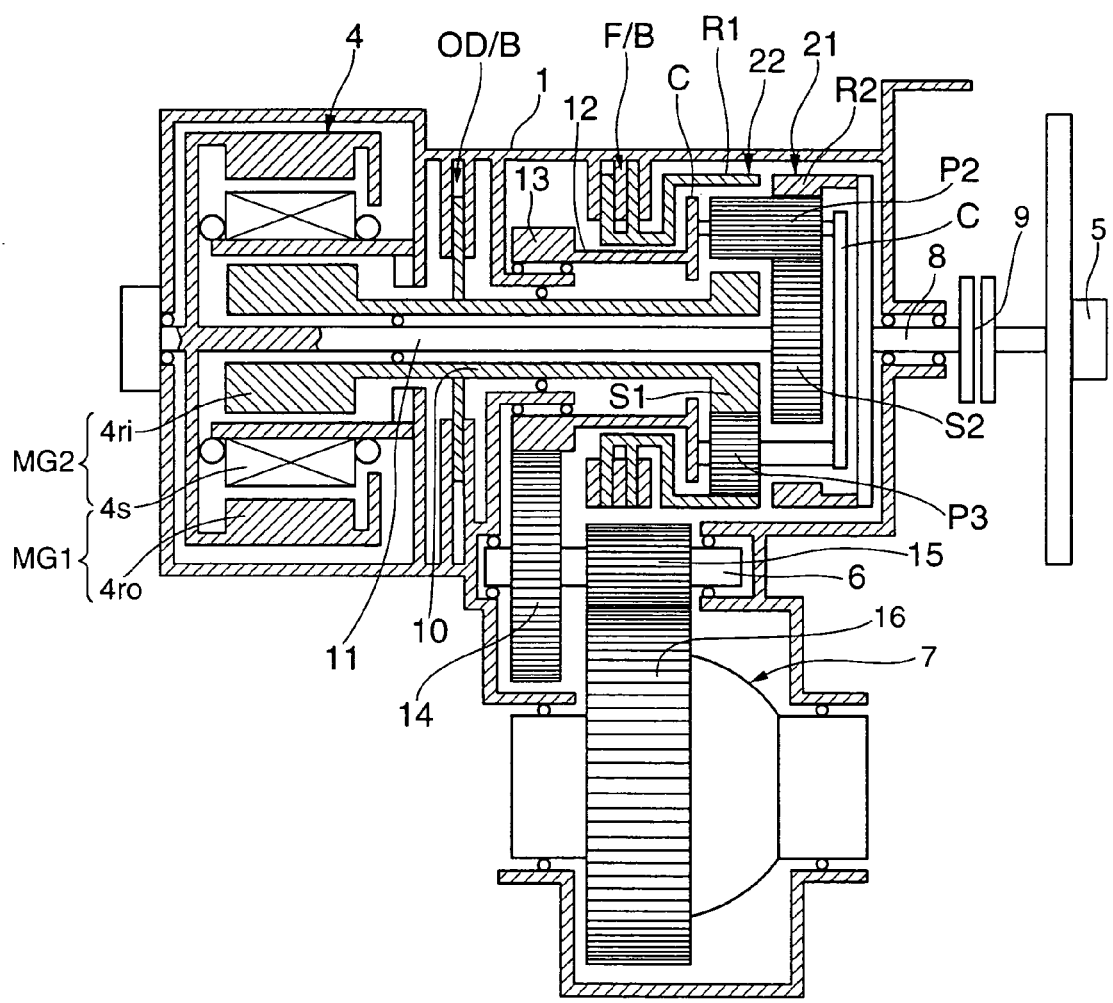
FIG. 5 is a cross-sectional view showing a hybrid transmission employing a Ravigneaux planetary gearset for comparison with the first and second embodiment.

For evaluating the first embodiment according to the present invention, FIG. 5 shows a differential mechanism constructed by a Ravigneaux planetary gearset which is a replacement of the differential mechanism constructed by the combination of double-pinion planetary gearsets 2 and 3 shown in FIG. 1A. In FIG. 5, elements as same as those in FIG. 1A are denoted by the same reference numeral of FIG. 1A.

This Ravigneaux planetary gearset is constructed by a single-pinion planetary gearset 21 and a double-pinion planetary gear set 22. Single-pinion planetary gearset 21 is located at a nearer position to engine 3 than double-planetary gearset 22. Single-pinion planetary gearset 21 is constructed such that common long pinions P2 are engaged with a sun gear S2, a ring gear R2. Double-pinion planetary gearset 8 comprises a sun gear S1, a ring gear R1 and pinions P3 in addition to common long pinions P2 and constructed such that pinions P3 are engaged with sun gear S1 and ring gear R1 and further with common long pinions P2. All of pinions P2 and P3 of planetary gearset 21 and 22 are rotatably supported by common carrier C.

The Ravigneaux planetary gearset is arranged such that ring gear R2 is connected to engine 5, carrier C is connected to output gear 13, sun gear S2 is connected to first motor/generator MG1 through center shaft 11, sun gear S1 is connected to second motor/generator MG2 through hollow shaft 10, ring gear R1 is capable of being fixed by the engagement of forward brake F/B and sun gear S1 is capable of being fixed by the engagement of overdrive brake OD/B.

Since sun gear S1 is connected to second motor/generator MG2 located at an inner side of first motor/generator MG1 in motor 4, it is impossible to dispose overdrive brake OD/B for fixing sun gear S1 at an outer periphery of motor 4. Therefore, overdrive brake OD/B is forced to be disposed between the Ravigneaux planetary gearset and motor 4. This arrangement of the increases the size of the hybrid transmission in the axial direction.

In contrast, it is apparent from FIG. 1A that the hybrid transmission according to the first embodiment of the present invention is arranged such that sun gear Ss to be fixed by overdrive brake OD/B is connected to first motor/generator MG1 located at an outer side of second motor/generator MG2 in motor 4. This arrangement of the first embodiment according to the present invention enables overdirve brake OD/B to be disposed at an outer periphery of motor 4. This prevents the hybrid transmission to be elongated in the axial direction.

Figure 6:
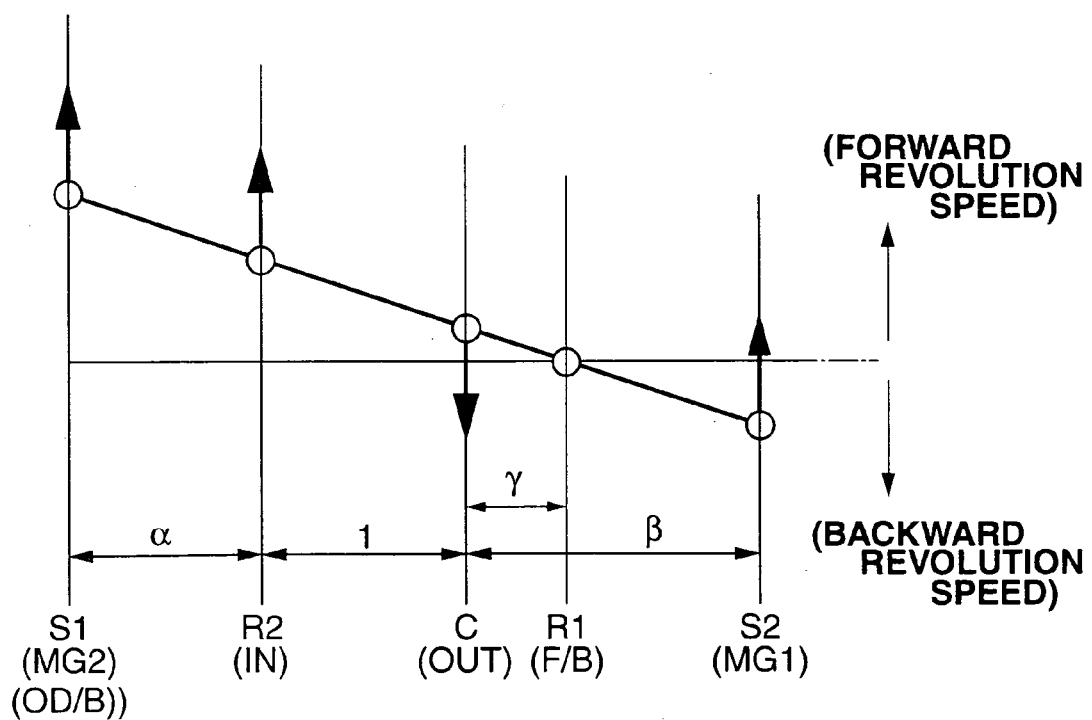
FIG. 6 is a lever diagram of the hybrid transmission of FIG. 5.

FIG. 6 shows a lever diagram of the hybrid transmission shown in FIG. 5. When a gear ratio from engine 5 (IN) to output (OUT) is 1, a gear ratio between engine 5 (IN) and second motor/generator MG2 (overdrive brake OD/B) is $\alpha$, a gear ratio between output OUT and first motor/generator MG1 is $\beta$, and a gear ratio between output OUT and forward brake F/B is $\gamma$. Further, the relationship among gear ratios $\alpha$, $\beta$ and $\gamma$ are expressed by the following expressions (4), (5) and (6). Herein the number of teeth of each gear is represented by a reference showing each gear.

$$\alpha = (R2/S1) - 1 \quad (4)$$

$$\beta = (R2/S2) \quad (5)$$

$$\gamma = (R2/R1) \quad (6)$$

In FIGS. 1A and 1B, the following conditions (7) and (8) are satisfied.

$$Ss < Sd \quad (7)$$

$$Rs < Rd \quad (8)$$

In FIGS. 5 and 6, the following conditions (9) and (10) are satisfied.

$$S1 < S2 \quad (9)$$

$$R2 < R1 \quad (10)$$

Herein, there is compared the hybrid transmission of the present invention arranged as shown in FIGS. 1A and 1B and the hybrid transmission shown in FIGS. 5 and 6. Assuming that first and second motor/generators MG1 and MG2 of the first embodiment are the same as those of the hybrid transmission shown in FIGS. 5 and 6, the minimum diameter of sun gear Sd connected to hollow shaft 10 is equal to the minimum diameter of sun gear S1 shown in FIGS. 5 and 6. Accordingly, a relationship between Ss and S2 can be expressed from the expressions (7) and (9) by the following expression (11).

$$Ss < Sd = S1 < S2 \quad (11)$$

A relationship between the maximum diameter of sun gears Sd and R1 is expressed by the following expressions (12).

$$Rd = R1 \quad (12)$$

Since the minimum values of Rs and R2 are determined from Sd and S1, it is assumed that the minimum value of Rs is almost equal to the minimum value of R2 as expressed by the following expression (13).

$$Rs \approx R2 \quad (13)$$

From these relationships, gear ratios β and γ take almost same value. Since each gear ratios α is determined from each of the expressions (1) and (4) and each size (number of teeth) of sun gear Ss and S1, an allowable range of gear ratio α in FIG. 1B is broader than that of gear ration α in FIG. 6 as is apparent from the expression (11).

Accordingly, with the first embodiment of the hybrid transmission (whose differential mechanism is constructed by the combination of double-pinion planetary gearsets 2 and 3) shown in FIGS. 1A and 1B, it becomes possible to approach the target performance of the hybrid transmission to the characteristic of first and second motor/generators MG1 and MG2 and to easily ensure a desired performance.

Further, since the first embodiment is arranged such that a pair of double-pinion planetary gearsets 2 and 3 is combined by commonly employing pinions P1 as inner pinions of double-pinion planetary gearset 3 and as outer pinions of double-pinion planetary gearset 2, it is possible to utilize a brake OD/B whose torque load is smaller than that of the other brake, as an overdrive brake. This realizes decreasing a unit size of the hybrid transmission, improving a starting performance by using forward brake F/B, and improving a fuel consumption at a high-speed running by using overdrive brake OD/B without enlarging first and second motor/generators MG1 and MG2.

Figure 2A:
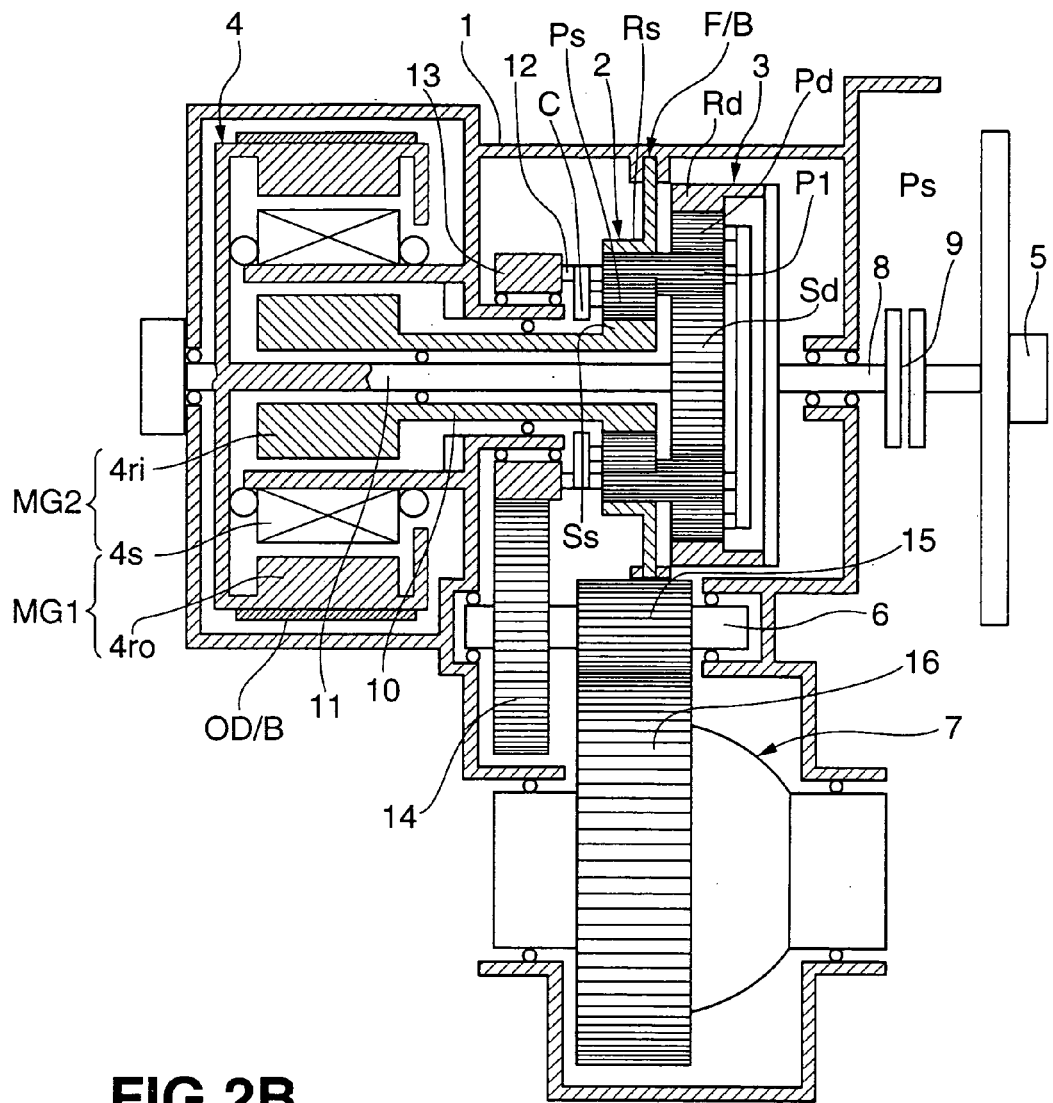
FIG. 2A is a cross-sectional view showing a second embodiment of the hybrid transmission according to the present invention.
Figure 2B:
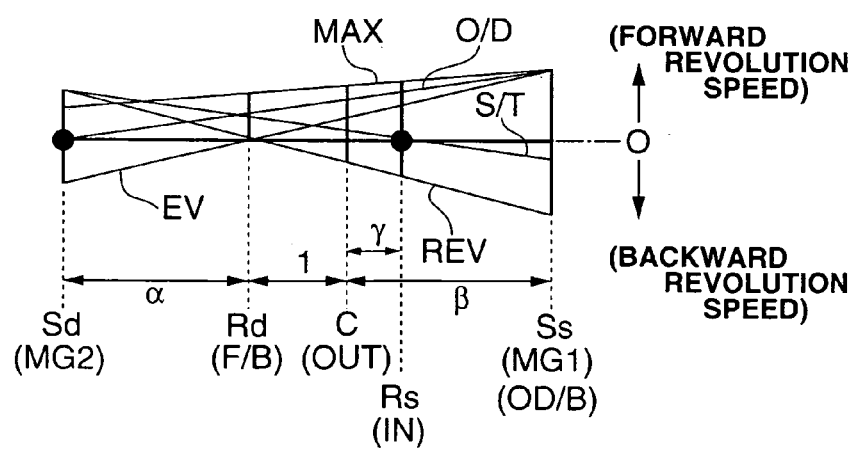
FIG. 2B is a lever diagram of the hybrid transmission of FIG. 2A.

Referring to FIGS. 2A and 2B, there is discussed a second embodiment of the hybrid transmission according to the present invention. In this second embodiment, the differential mechanism is constructed by disposing double-pinion planetary gearset 3 at a near side of engine 5 and disposing double-pinion planetary gearset 3 at a near side of motor 4.

As is clear from a lever diagram shown in FIG. 2B, the sequence of revolution speeds of the rotating members is arranged in the sequence of sun gear Sd, ring gear Rd, carrier C, ring gear Rs and sun gear Ss.

These rotating members (sun gear Sd, ring gear Rd, carrier C, ring gear Rs and sun gear Ss) are respectively connected to first motor/generator MG1 (outer rotor 4ro), input (IN) from engine 5, output (OUT) to the wheel driveline, forward brake F/B to be engaged during the vehicle starting, and second motor/generator MG2 (inner rotor 4ri), in the sequence of mention. Further, sun gear Sd disposed at the highest revolution speed position is connected to overdrive brake OD/B which is to be engaged when the overdrive running is executed.

This hybrid transmission of the second embodiment can gain the advantages in the shifting operation as is the same as those of the first embodiment, as shown by levers S/T, MAX, O/D, EV and REV of the lever diagram in FIG. 2B. Further, since sun gear Sd fixed by overdrive brake OD/B is connected to first motor/generator MG1 disposed at an outer side of second motor/generator MG2 in motor 4 as shown in FIG. 2A, it is possible to dispose overdrive brake OD/B at an outer periphery of motor 4. This also suppress the size of the hybrid transmission in the axial direction.

Herein, it is proven that the gear ratio selectable range of the second embodiment is broader than that of the hybrid transmission employing the Ravigneaux planetary gearset shown in FIG. 5.

FIG. 2B shows a lever diagram of the hybrid transmission shown in FIG. 2A. When a gear ratio from engine 5 (IN) to output (OUT) is 1, a gear ratio between engine 5 (IN) and first motor/generator MG1 (overdrive brake OD/B) is α, a gear ratio between output OUT and second motor/generator MG1 is β, and a gear ratio between output OUT and forward brake F/B is γ. The relationship among gear ratios α, β and γ are expressed by the following expressions (14), (15) and (16). Herein the number of teeth of each gear is represented by a reference showing each gear.

$$\alpha = (Rd/Sd) - 1 \quad (14)$$

$$\beta = (Rd/Ss) \quad (15)$$

$$\gamma = (Rd/Rs) \quad (16)$$

Herein, there is compared the hybrid transmission of the present invention arranged as shown in FIGS. 2A and 2B and the hybrid transmission shown in FIGS. 5 and 6. Assuming that first and second motor/generators MG1 and MG2 of the second embodiment shown in FIGS. 2A and 2B are the same as those of the hybrid transmission shown in FIGS. 5 and 6, the minimum diameter of sun gear Ss connected to hollow shaft 10 is equal to the minimum diameter of sun gear S1 shown in FIGS. 5 and 6, as shown by the following expression (17).

$$Ss = S1 \quad (17)$$

Although the maximum diameter of each of sun gears Ss and S1 is determined from the size of each of sun gears Sd and S2, the size of pinions does not affect the gear ratios. Accordingly, the following expression (18) is satisfied.

$$Sd \approx S2 \quad (18)$$

By determining the maximum outer diameter, the following expression (19) is satisfied.

$$Rd=R1 \quad (19)$$

Since the minimum values of ring gears Rs and R2 are determined from sun gears Sd and S1, respectively, it is assumed that the minimum value of ring gear Rd is almost equal to the minimum value of ring gear R2 as expressed by the following expression (20).

$$Rs \approx R2 \quad (20)$$

From these relationships, gear ratios β and γ take almost same value. Since each gear ratio α is defined from each of the expressions (15) and (4) and each size (number of teeth) of sun gears Ss and S2, the relationship between sun gears Ss and S2 is expressed by the following expression (21) based on the expressions (7), (9) and (17).

$$Ss<S2 \quad (21)$$

An allowable range of gear ratio β in FIG. 2B is broader than that of gear ratio β in FIG. 6 as is apparent from the expressions (5) and (15). Accordingly, with the second embodiment of the hybrid transmission, whose differential mechanism is constructed by the combination of double-pinion planetary gearsets 2 and 3, shown in FIGS. 2A and 2B, it becomes possible to approach the target performance of the hybrid transmission to the characteristic of first and second motor/generators MG1 and MG2 and to easily ensure a desired performance.

Further, since the first and second embodiments according to the present invention are arranged such that first and second motor/generators MG1 and MG2 are constructed by compound multiphase alternating current (AC) multi-layer (double-layer) motor 4, which has inner rotor 4ri, outer rotor 4ro surrounding inner rotor 4ri and stator coil 4s, it becomes possible to improve first and second motor/generators MG1 and MG2 in size, production cost and efficiency. These improvements of first and second motor/generators MG1 and MG2 contribute to improve the hybrid transmission in layout design, production cost and fuel consumption.

Furthermore, the thus arranged hybrid transmission according to the first and second embodiments of the present invention is arranged such that the differential mechanism of the hybrid transmission is constructed by the two double-pinion planetary gearsets 2 and 3 which are coaxially arranged and interlinked through common pinions P1. Therefore, the change of a pitch-circle diameter of pinions in these gearsets 2 and 3 does not affect the gear ratio (transmission ratio) produced by the differential mechanism. This enables pitch-circle diameters of both sun gears to be freely varied by varying a pitch-circle diameter of other pinions except for common pinions P1. This variable setting of the pitch-circle diameter of the other pinions contributes the increase of the degree of freedom in designing the transmission-ratio range.

Figure 3:
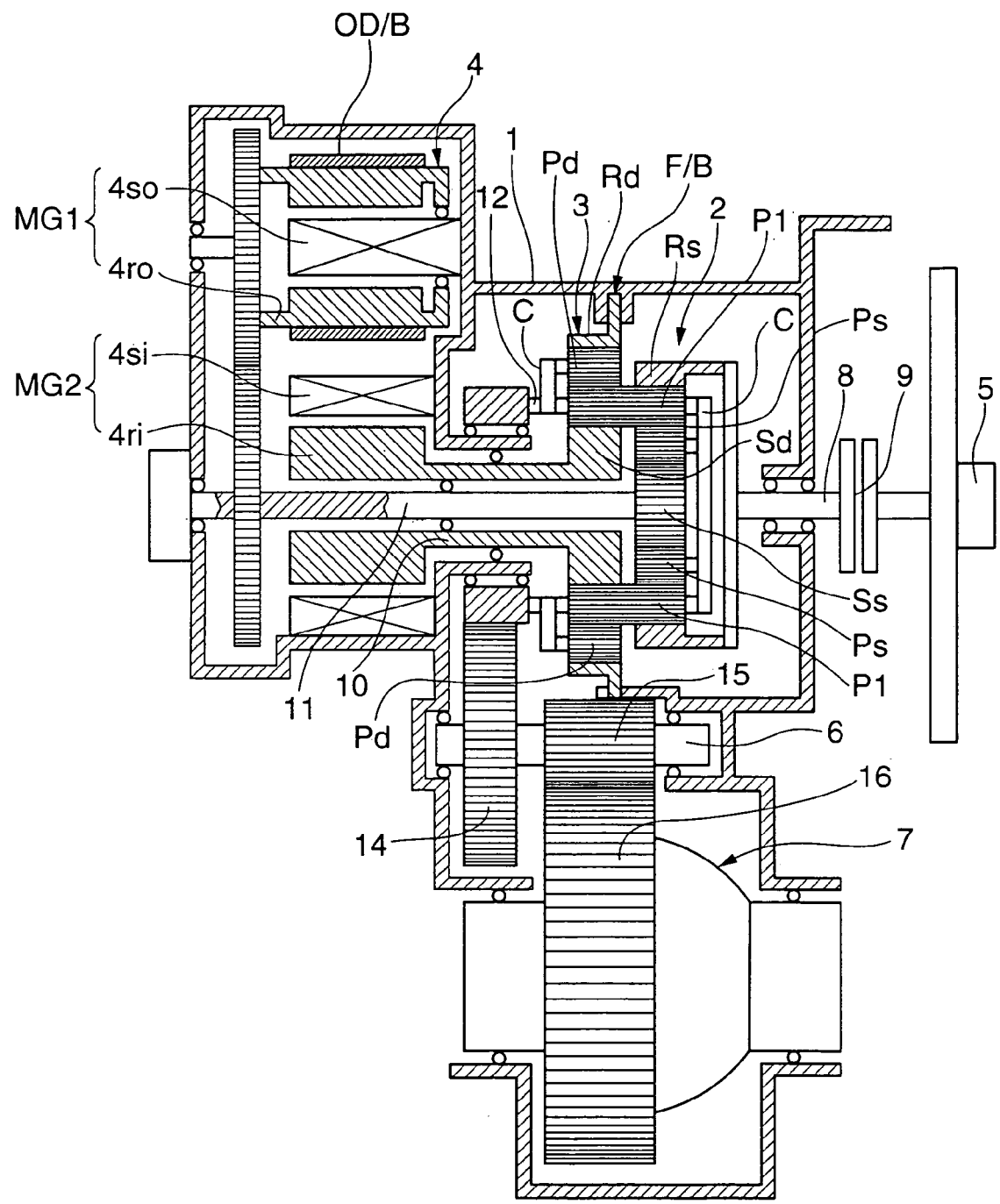
FIG. 3 is a cross-sectional view showing a modification of the first embodiment.
Figure 4:
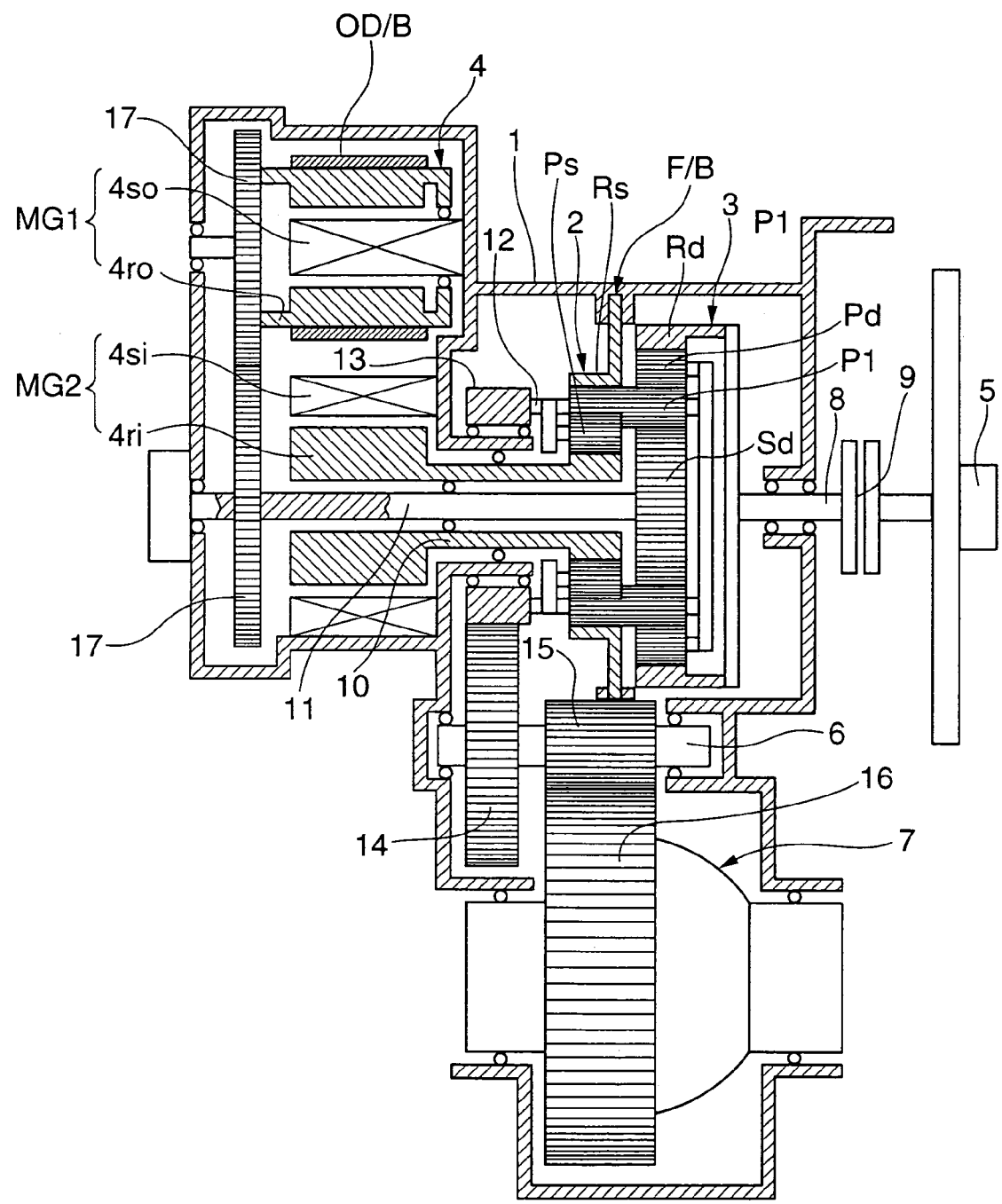
FIG. 4 is a cross-sectional view showing a modification of the second embodiment.

Although the first and second embodiments according to the present invention have been shown and described to employ the compound multiphase AC double-layer motor 4 as first and second motor/generators MG1 and MG2, the invention is not limit to this arrangement. For example, first and second motor/generators MG1 and MG2 of the first embodiment shown in FIG. 1A may be arranged as shown in FIG. 3, and those of the second embodiment shown in FIG. 2A may be arranged as shown in FIG. 4, such that first and second motor/generators MG1 and MG2 are offset side by side. More specifically, first motor/generator MG1 may be constructed by a special center stator 4so fixed to transmission case 1 and an outer rotor which is disposed around center stator 4so and is rotatable relative to transmission case 1. In the arrangements shown in FIGS. 3 and 4, first motor/generator MG1 and second motor/generator MG2 are disposed side by side, and outer rotor 4so of first motor/generator MG1 is drivingly connected center shaft 11 through a gearset 17.

This application is based on prior Japanese Patent Application No. 2002-352225. The entire contents of the Japanese Patent Application No. 2002-352225 with a filing date of Dec. 4, 2002 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A hybrid transmission for variably producing a transmission ratio, comprising:

a first motor/generator and a second motor/generator;

a differential mechanism constructed by two double-pinion planetary gearsets which are coaxially arranged and commonly employ common pinions, the differential mechanism including at least four rotating members, the rotating members being interlinked so that rotating conditions of all of the rotating members are determined when rotating conditions of two of the rotating members are determined, four of the rotating members being connected to an input from a prime mover, an output to a driveline, the first motor/generator and the second motor/generator, respectively, wherein the prime mover is coaxially disposed at a side of the differential mechanism, and the first and the second motor/generators being coaxially disposed at the other side of the differential mechanism, wherein the four rotating members have a speed relationship among revolution speeds thereof, a sun gear of a prime-mover-side double-pinion planetary gearset being connected to the second motor/generator through a center shaft, the sun gear of the prime-mover-side double-pinion planetary gearset being a rotating member of a first revolution speed in the speed relationship, a sun gear of a motor/generator-side double-pinion planetary gearset being connected to the second motor/generator through a hollow shaft, the sun gear of the motor/generator-side double-pinion planetary gearset being a rotating member of a fourth revolution speed in the speed relationship, a rotating member of a second revolution speed in the speed relationship being connected to the input from the prime mover, a rotating member of a third revolution speed in the speed relationship being connected to the output to the wheel driveline, wherein the first, second, third, and fourth revolution speeds are respectively in sequence in either an increasing order of revolution speeds or in a decreasing order of revolution speeds; and a brake for fixing the sun gear of the prime-mover-side double-pinion planetary gearset, the brake being disposed at an outer periphery of the first motor/generator.

2. The hybrid transmission as claimed in claim 1, wherein the first and second motor/generators are coaxially arranged, and shafts of the first and second motor generators are also coaxially arranged.

3. The hybrid transmission as claimed in claim 1, wherein the common pinions act as inner pinions of one of the two double-pinion planetary gearsets and as outer pinions of the other of the two double-pinion planetary gearsets.

4. The hybrid transmission as claimed in claim 1, wherein a gear pitch-circle diameter of the sun gear of the prime-mover-side double-pinion planetary gearset is set smaller than a gear pitch-circle diameter of the sun gear of the motor/generator-side double-pinion planetary gearset, and the common pinions act as outer pinions of the prime-mover-side double-pinion planetary gearset and as inner pinions of the motor/generator-side double-pinion planetary gearset.

5. The hybrid transmission as claimed in claim 1, wherein a gear pitch-circle diameter of the sun gear of the motor/generator-side double-pinion planetary gearset is set smaller than a gear pitch-circle diameter of the sun gear of the prime-mover-side double-pinion planetary gearset, and the common pinions act as outer pinions of the motor/generator-side double-pinion planetary gearset and as inner pinions of the prime-mover-side double-pinion planetary gearset.

6. The hybrid transmission as claimed in claim 1, wherein torque generated by the first and second motor/generators is set at zero when the brake fixes the sun gear of the prime-mover-side double-pinion planetary gearset.

7. The hybrid transmission as claimed in claim 1, wherein the brake fixes the sun gear of the prime-mover-side double-pinion planetary gearset when a vehicle equipped with the hybrid transmission is stopping under an electric vehicle mode where the vehicle runs only by means of the first and second motor/generators.

8. The hybrid transmission as claimed in claim 1 wherein the two double-pinion planetary gearsets employ a common carrier which rotatably supports all of pinions of the two double-pinion planetary gearsets and acts as the rotating member connected to the output to the driveline.

* * * * *